(12) United States Patent
Jalkanen et al.

(10) Patent No.: US 7,145,437 B2
(45) Date of Patent: Dec. 5, 2006

(54) METHOD, TERMINAL AND COMPUTER PROGRAM PRODUCT FOR ADJUSTING POWER CONSUMPTION OF A RFID READER ASSOCIATED WITH A MOBILE TERMINAL

(75) Inventors: Janne Jalkanen, Helsinki (FI); Heikki Huomo, Oulu (FI); Petri Vesikivi, Espoo (FI); Carmen Kühl, Dortmund (DE)

(73) Assignee: Nokia Corporation, Espoo (FI)

( * ) Notice: Subject to any disclaimer, the term of this patent is extended or adjusted under 35 U.S.C. 154(b) by 228 days.

(21) Appl. No.: 10/687,146

(22) Filed: Oct. 16, 2003

(65) Prior Publication Data

US 2005/0083181 A1 Apr. 21, 2005

(51) Int. Cl.
*H04Q 5/22* (2006.01)
*H04B 5/00* (2006.01)
*H04B 7/00* (2006.01)
*H04B 1/16* (2006.01)

(52) U.S. Cl. .................. 340/10.3; 455/41.1; 455/41.2; 455/343.2

(58) Field of Classification Search ............. 340/10.34, 340/10.2, 10.3; 455/343.2
See application file for complete search history.

(56) References Cited

U.S. PATENT DOCUMENTS

| | | | |
|---|---|---|---|
| 5,305,008 A * | 4/1994 | Turner et al. ................. 342/44 |
| 5,623,257 A * | 4/1997 | Bachhuber ................. 340/5.28 |
| 5,640,002 A | 6/1997 | Ruppert et al. |
| 6,150,948 A | 11/2000 | Watkins |
| 6,232,875 B1 * | 5/2001 | DeZorzi ..................... 340/442 |
| 6,542,114 B1 * | 4/2003 | Eagleson et al. ...... 342/357.07 |
| 6,593,845 B1 | 7/2003 | Friedman et al. |
| 6,677,852 B1 * | 1/2004 | Landt ......................... 340/10.1 |
| 2002/0075146 A1 * | 6/2002 | Saheki ...................... 340/10.1 |
| 2002/0174073 A1 | 11/2002 | Nordman et al. |

FOREIGN PATENT DOCUMENTS

EP 660624 A1 * 6/1995

* cited by examiner

*Primary Examiner*—Clara Yang
(74) *Attorney, Agent, or Firm*—Alston & Bird LLP

(57) ABSTRACT

The method, terminal and computer program product determine the context of the mobile terminal associated with the RFID reader and adjusts the power consumption of the RFID reader based upon the determined context relative to at least one previous context determination. To adjust the power consumption, the frequency at which the RFID reader is actuated may be altered. Thus, the power consumption of the RFID reader may be reduced when no change in the context of the mobile terminal is determined and/or may be increased when a change in the context of the mobile terminal is determined. Due to the adjustment of power consumption by RFID readers, power is conserved in the mobile terminals associated with RFID readers, which permits the mobile terminals and RFID readers to operate longer without requiring charging or replacement of the power supply.

32 Claims, 4 Drawing Sheets

METHOD, TERMINAL AND COMPUTER PROGRAM PRODUCT FOR ADJUSTING POWER CONSUMPTION OF A RFID READER ASSOCIATED WITH A MOBILE TERMINAL

FIELD OF THE INVENTION

This invention relates to the optimization of power consumption of battery powered devices, and more particularly, relates to the optimization of power consumption by a radio frequency identification (RFID) reader associated with a mobile terminal.

BACKGROUND OF THE INVENTION

Radio frequency identification (RFID) readers have been associated with mobile products, such as cellular phones, personal digital assistants, pagers and other mobile devices. Continuous active operation of typical RFID readers, however, consume significant amounts of power. Therefore, the mobile devices with which RFID readers are associated require larger power supplies and more frequent charging of the power supplies for the mobile device to continue operation than comparable mobile devices that are not associated with a RFID reader. The larger power supplies lead to larger mobile devices, which is not desirable, and frequent charging of the power supplies for the mobile device is inconvenient and reduces the lifetime of the power supply.

As such, there is a need in the industry to conserve the power in mobile devices associated with RFID readers to permit utilization of typical power supplies and typical power supply charging schedules for the mobile devices. One type of power-conserving method for RFID readers is to read only the identification portion of a RFID tag, and if the RFID reader identifies that it has previously read the tag based upon the identification portion, the RFID reader does not read the rest of the tag. While this power-conserving method is helpful, the RFID reader still consumes more power than desired.

One method utilized to conserve power in mobile devices is to measure the movement of the device and to continue active operation of the device while the movement of the device is unknown. When the movement of the device is identified, however, one or more of the subunits of the device is changed from an active operation mode to a sleep operation mode, where the sleep operation mode consumes less power than the active operation mode. The device then stays in the sleep operation mode while the movement of the device is known, then changes back to the active operation mode when the movement of the device becomes unknown. Again, while this power-conserving method is helpful, the device still consumes more power than desired because the device is in an active operation mode anytime the movement is unknown, which can be quite a bit of the time that a mobile device is used.

Thus, there is a need for techniques that permit greater conservation of power in mobile devices associated with a RFID reader so that the mobile device does not need a larger power supply or frequent power supply charging. In particular, there is a need to utilize the existing abilities of a mobile device to provide information regarding the context of the mobile device that may be utilized to optimize the power-consumption of a RFID reader associated with the mobile device.

BRIEF SUMMARY OF THE INVENTION

The present invention provides techniques for greater conservation of power in mobile devices associated with RFID readers, such that the mobile device does not need a larger power supply or as frequent charging of the power supply as mobile devices that do not utilize the techniques of the present invention. In particular, the techniques for power conservation of the present invention utilize the existing abilities of a mobile device to provide information regarding the context of the mobile device to optimize the power-consumption of a RFID reader associated with the mobile device.

One embodiment of a method and computer program product for adjusting power consumption of a RFID reader includes determining the context of the mobile terminal that is associated with the RFID reader, such as by a first executable portion, and adjusting the power consumption of the RFID reader based upon the context of the mobile terminal relative to at least one previous context determination of the mobile terminal, such as by a second executable portion. To adjust the power consumption of the RFID reader, the frequency at which the RFID reader is actuated may be altered. In further embodiments, any RFID tags in an area proximate the mobile terminal may be detected, such as by a third executable portion, in response to interrogation by the RFID reader. Changes in the context of the mobile terminal then may be determined by monitoring changes in the detection of RFID tags in the area proximate the mobile terminal relative to a prior interrogation to indicate a change in context of the mobile terminal, such as by the first executable portion. In this embodiment, the power consumption of the RFID reader may be adjusted based upon the determination of whether the context of the mobile terminal has changed.

Thus, the power consumption of the RFID reader may be reduced when no change in the context of the mobile terminal is determined and/or may be increased when a change in the context of the mobile terminal is determined, such as by the second executable portion. For example, in one embodiment, the power consumption of the RFID reader may be reduced by reducing the frequency at which the area proximate the mobile terminal is interrogated by the RFID reader. In further embodiments, the power consumption of the RFID reader may be reduced by ceasing interrogation of the area proximate the mobile terminal until a change in the context of the mobile terminal is detected. To increase the power consumption of the RFID reader, according to certain embodiments, the frequency at which the area proximate the mobile terminal is interrogated by the RFID reader may be increased. In addition, adjusting the power consumption of the RFID reader may also include changing an operation mode of the RFID reader in other embodiments of the present invention.

The present invention also includes a mobile terminal that includes a RFID reader, at least one processor and at least one controller in communication with the at least one processor. The processor(s) determine the context of the mobile terminal based upon information received regarding an environment of the mobile terminal and the controller(s) adjust the power consumption of the RFID reader based upon the context of the mobile terminal by altering the frequency at which the RFID reader is actuated. In certain embodiments, the RFID reader includes the processor(s) and/or the controller(s). The processor(s) may include the controller(s) in further embodiments of the present invention.

In one embodiment of the mobile terminal of the present invention, the RFID reader detects any RFID tags in an area proximate the mobile terminal in response to the interrogations by the RFID reader. In this embodiment, the processor(s) determine whether the context of the mobile terminal has changed by monitoring any changes in the detection of RFID tags in the area proximate the mobile terminal and the controller(s) adjust the power consumption of the RFID reader based upon whether the context of the mobile terminal ahs changed.

Other embodiments of the mobile terminal may include at least one sensor to provide at least a portion of the information received regarding the environment of the mobile terminal. The sensor(s) may include a proximity detector, a movement detector and/or a temperature detector. The mobile device of certain embodiments also may include a timer for tracking time between determinations of a change in context. In further embodiments, the mobile device may include a switch in communication with the controller(s) to adjust the power consumption of the RFID reader by changing an operational mode of the RFID reader.

Thus, the method, terminal and computer program product of the present invention are capable of adjusting the power consumption of RFID readers that are associated with mobile terminals based upon the context of the mobile terminal. The RFID reader, therefore, uses less power when the associated mobile terminal has a particular context or when certain changes in the context of the mobile terminal are not detected. As such, other than when the mobile terminal has a particular context or when certain changes in the context of the mobile terminal are detected, RFID readers associated with mobile terminals operate at relatively low power levels. Due to the adjustment of power consumption by RFID readers, the present invention conserves power of the mobile terminals associated with RFID readers, which permits the mobile terminals and RFID readers to operate longer without requiring charging or replacement of the power supply as compared to mobile terminals associated with RFID readers that do not use these techniques.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
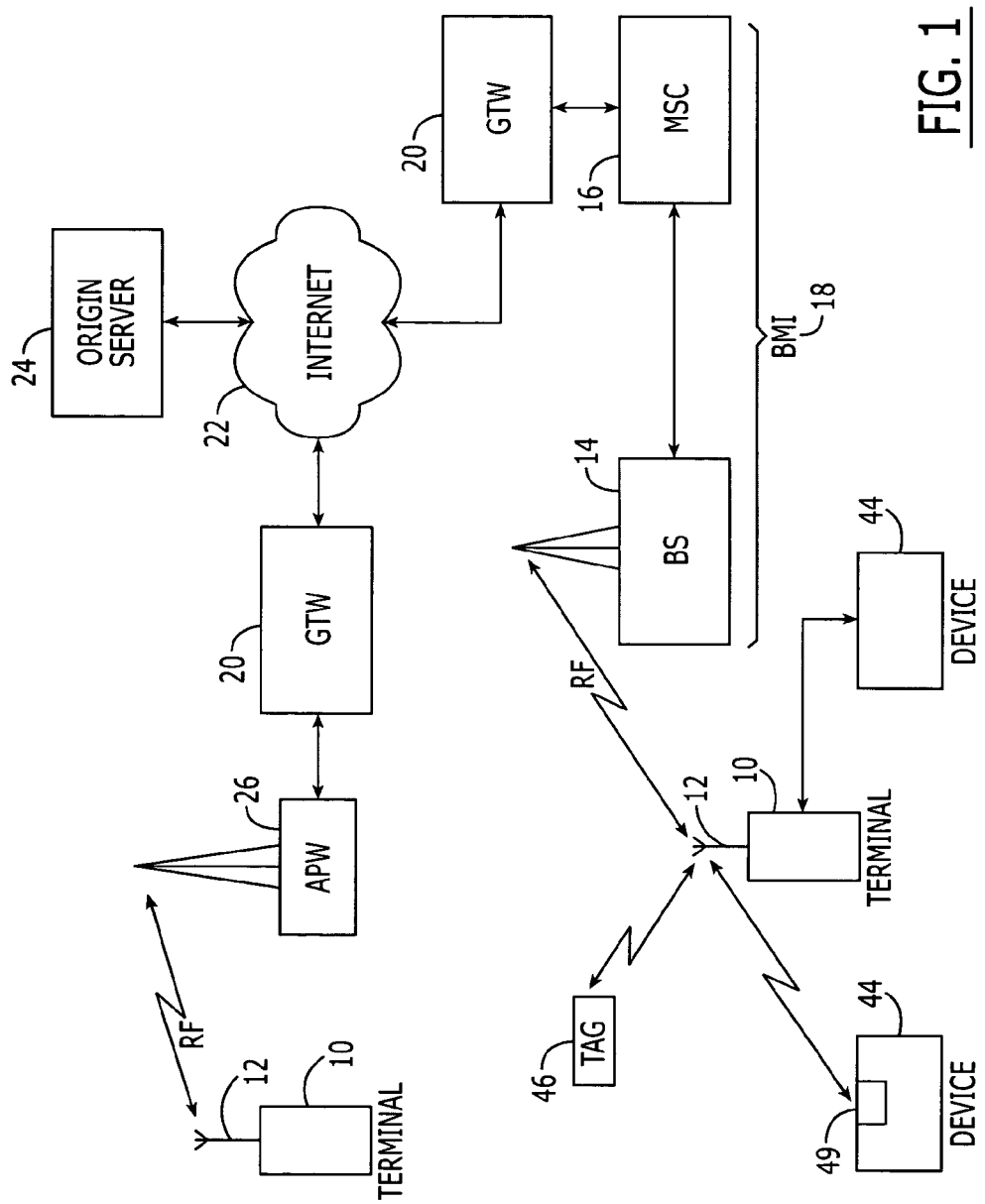
FIG. 1 is a block diagram of one type of terminal and system that would benefit from embodiments of the present invention.

Referring to FIG. 1, an illustration of one type of terminal and system that would benefit from embodiments of the present invention is provided. The system, terminal and method of embodiments of the present invention will be primarily described in conjunction with mobile communications applications. It should be understood, however, that the system, terminal and method of the present invention may be utilized in conjunction with a variety of other applications, both in the mobile communications industries and outside of the mobile communications industries. For example, the system, terminal and method of the present invention can be utilized in conjunction with wireline and/or wireless network (e.g., Internet) applications.

As shown, a terminal 10 may include an antenna 12 for transmitting signals to and for receiving signals from a base site or base station (BS) 14. The base station is a part of a cellular network that includes elements required to operate the network, such as a mobile switching center (MSC) 16. As well known to those skilled in the art, the cellular network may also be referred to as a Base Station/MSC/Interworking function (BMI) 18. In operation, the MSC is capable of routing calls and messages to and from the terminal when the terminal is making and receiving calls. The MSC also provides a connection to landline trunks when the terminal is involved in a call. Further, the MSC can, but need not, be coupled to a server GTW 20 (Gateway).

The MSC 16 can be coupled to a network, such as a local area network (LAN), a metropolitan area network (MAN), and/or a wide area network (WAN). The MSC can be coupled to the network directly, or if the system includes a GTW 20 (as shown), the MSC can be coupled to the network via the GTW. In one typical embodiment, for example, the MSC is coupled to the GTW, and the GTW is coupled to a WAN, such as the Internet 22. In turn, devices such as processing elements (e.g., personal computers, server computers or the like) can be coupled to the terminal 10 via the Internet. For example, the processing elements can include one or more processing elements associated with an origin server 24. Additionally, the network may be coupled to one or more wireless access points (APs) 26, which may be wirelessly coupled to one or more terminals 10. By directly or indirectly connecting the terminals and the other devices (e.g., origin server) to the Internet, the terminals can communicate with the other devices and with one another, such as according to the Hypertext Transfer Protocol (HTTP), to thereby carry out various functions of the terminal.

Figure 2:
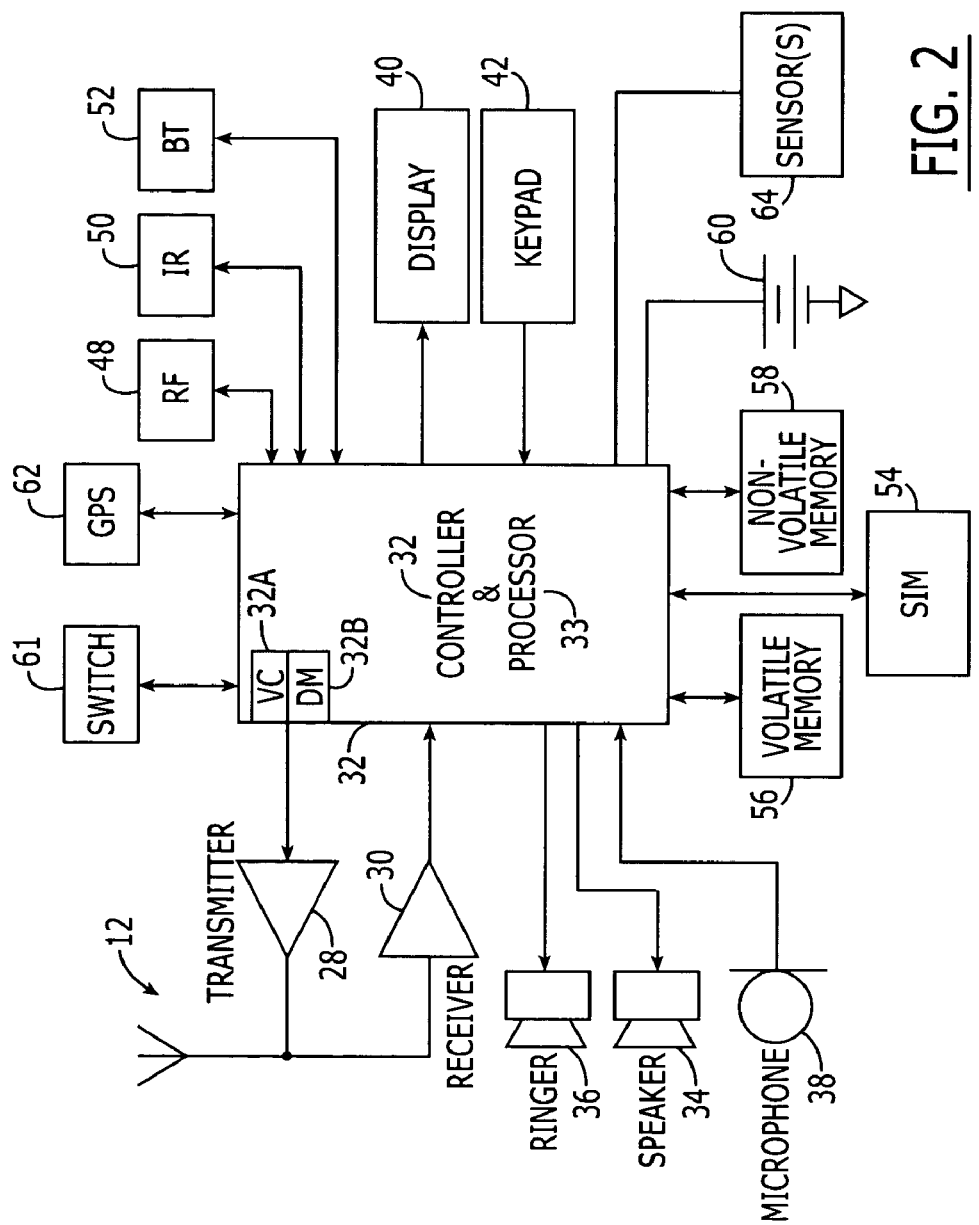
FIG. 2 is a schematic block diagram of a mobile terminal in accordance with one embodiment of the present invention.

Reference is now made to FIG. 2, which illustrates one type of terminal 10, a mobile terminal, that would benefit from embodiments of the present invention. It should be understood, however, that the mobile terminal illustrated and hereinafter described is merely illustrative of one type of terminal that would benefit from the present invention and, therefore, should not be taken to limit the scope of the present invention. While several embodiments of the terminal are illustrated and will be hereinafter described for purposes of example, other types of terminals, such as portable digital assistants (PDAs), pagers, laptop computers and other types of electronic systems, can readily employ the present invention.

As shown, in addition to an antenna 12, the mobile terminal includes a transmitter 28, a receiver 30, a controller 32, and a processor 33 that provides signals to and receives signals from the transmitter and receiver, respectively. These signals include signaling information in accordance with the air interface standard of the applicable cellular system, and also user speech and/or user generated data. In this regard, the mobile terminal can be capable of operating with one or more air interface standards, communication protocols, modulation types, and access types. More particularly, the mobile terminal can be capable of operating in accordance with any of a number of first generation (1G), second generation (2G), 2.5G and/or third-generation (3G) communication protocols or the like. For example, the mobile terminal may be capable of operating in accordance with 2G wireless communication protocols IS-136 (TDMA), GSM, and IS-95 (CDMA). Some narrow-band AMPS (NAMPS), as well as TACS, mobile terminals may also benefit from the teaching of this invention, as should dual or higher mode phones (e.g., digital/analog or TDMA/CDMA/analog phones). In some embodiments of the mobile terminal of the present invention, the processor 33 includes the controller 32.

It is understood that the controller 32 includes the circuitry required for implementing the audio and logic functions of the mobile terminal. For example, the controller may be comprised of a digital signal processor device, a microprocessor device, and various analog-to-digital converters, digital-to-analog converters, and other support circuits. The control and signal processing functions of the mobile terminal are allocated between these devices according to their respective capabilities. The controller can additionally include an internal voice coder (VC) 32A, and may include an internal data modem (DM) 32B. Further, the controller may include the functionally to operate one or more software programs, which may be stored in memory (described below). For example, the controller may be capable of operating a connectivity program, such as a conventional Web browser. The connectivity program may then allow the mobile terminal to transmit and receive Web content, such as according to the Hypertext Transfer Protocol (HTTP) and/or the Wireless Application Protocol (WAP), for example.

The mobile terminal also comprises a user interface including a conventional earphone or speaker 34, a ringer 36, a microphone 38, a display 40, and a user input interface, all of which are coupled to the controller 32. The user input interface, which allows the mobile terminal to receive data, can comprise any of a number of devices allowing the mobile terminal to receive data, such as a keypad 42, a touch display (not shown) or other input device. In embodiments including a keypad, the keypad includes the conventional numeric (0–9) and related keys (#, *), and other keys used for operating the mobile terminal. Although not shown, the mobile terminal can include a battery, such as a vibrating battery pack, for powering the various circuits that are required to operate the mobile terminal, as well as optionally providing mechanical vibration as a detectable output.

The mobile terminal can also include one or more means for sharing and/or obtaining data from electronic devices 44, tags 46 or the like. As will be appreciated, the electronic devices and tags can comprise any of a number of different known devices and tags capable of transmitting and/or receiving data in accordance with any of a number of different wireline and/or wireless techniques. For example, the electronic devices can comprise any of a number of different terminals 10, including other mobile terminals, portable digital assistants (PDAs), pagers, laptop computers and other types of electronic systems. Likewise, for example, the tags can comprise Radio Frequency Identification (RFID) transponder tags or the like.

As shown in FIG. 2, the mobile terminal can include a radio frequency (RF) transceiver 48 (which includes a RFID reader) so that data can be shared with and/or obtained from electronic devices 44 including other radio frequency transceivers (shown as 49 in FIG. 1), and/or RFID transponder tags 46. In some embodiments of the mobile terminal of the present invention, the RFID reader also includes the processor 33 and/or the controller 32. The mobile terminal can additionally, or alternatively, include other short-range communication transceivers, such as, for example, an infrared (IR) transceiver 50, and/or a Bluetooth (BT) transceiver 52 operating using Bluetooth brand wireless technology developed by the Bluetooth Special Interest Group. The RF transceiver 48 and/or other transceivers may be associated with the mobile terminal in any manner known to those skilled in the art. For example, in some embodiments, the RF transceiver 48 and/or other transceivers may be integrated in the mobile terminal or may be separate from, but in communication with, the mobile terminal, such as via any type of wireline and/or wireless techniques. The mobile terminal can therefore additionally or alternatively be capable of transmitting data to and/or receiving data from electronic devices and/or tags. Although not shown, the mobile terminal may additionally or alternatively be capable of transmitting and/or receiving data from electronic devices and/or tags according to a number of different wireless networking techniques, including, but not limited to, for example, WLAN techniques such as IEEE 802.11 techniques or the like.

The mobile terminal 10 also may include a switch 61 that is in communication with and under the control of the controller 32. As such, the switch 61 may be included in the controller 32 or separate from, but in communication with, the controller 32, such as via any type of wireline and/or wireless techniques known to those skilled in the art. In addition to other functions, the switch 61 may be capable of changing an operational mode of the RF transceiver 48. For example, in one embodiment, the switch 61 may change the operational mode of the RF transceiver 48 among a full-power active mode, one or more partial power modes and a low-power sleep mode. In other embodiments, the switch 61 may change the operational mode of the RF transceiver 48 among any other operational modes known to those skilled in the art.

The mobile terminal also includes a battery 60, such as a vibrating battery pack, for powering the various circuits that are required to operate the mobile terminal, as well as optionally providing mechanical vibration as a detectable output. For example, the battery 60 may provide at least a portion of the power required to operate the RFID reader. In addition, the mobile terminal may include a positioning sensor, such as a global positioning system (GPS) sensor 62. In this regard, the GPS sensor is capable of determining a location of the mobile terminal, such as longitudinal and latitudinal directions of the mobile terminal.

The mobile terminal can further include memory, such as a subscriber identity module (SIM) 54, a removable user identity module (R-UIM) or the like, which typically stores information elements related to a mobile subscriber. In addition to the SIM, the mobile terminal can include other removable and/or fixed memory. In this regard, the mobile terminal can include volatile memory 56, such as volatile Random Access Memory (RAM) including a cache area for the temporary storage of data. The mobile terminal can also include other non-volatile memory 58, which can be embedded and/or may be removable. The non-volatile memory can additionally or alternatively comprise an EEPROM, flash memory or the like. The memories can store any of a number of pieces of information, and data, used by the mobile terminal to implement the functions of the mobile terminal. The memories can also store one or more applications capable of operating on the mobile terminal.

The mobile terminal may also include one or more sensors 64 for sensing the ambient conditions of the mobile user and, more particularly, the mobile terminal operated by, or otherwise under the control of, the mobile user. In this regard, the mobile terminal may include sensors such as, for example, a positioning sensor, a touch sensor, an audio sensor, a compass sensor, an ambient light sensor, an ambient temperature sensor, an ambient pressure sensor, a proximity sensor, and/or an acceleration sensor. The audio sensor can include the microphone 38, for example, which can detect speech or environmental sounds. The positioning sensor can include, for example, the GPS sensor 62. Additionally, or alternatively, the positioning sensor can include, for example, a radio beacon triangulation sensor that determines the location of the mobile terminal by means of a network of radio beacons, base stations, or access points, as is described for example, in Nokia European patent EP 0 767 594 A3, entitled "Mobile Station Positioning System" published on May 12, 1999, the contents of which are hereby incorporated by reference in its entirety. As will be appreciated, the sensors can also be located in accessory-like mobile terminal covers and/or in a wireless accessory such as a Bluetooth-enabled device. The sensors may further be located in the environment such as in the user's rooms or vehicles. Also, information capable of being measured by the mobile terminal, such as the time duration of use of the mobile terminal, can be received as sensor data by the mobile terminal. For more information on such sensors, see U.S. patent application Ser. No. 09/854,628, entitled "Context Sensitive Web Services" filed May 15, 2001 and published Nov. 21, 2002 as U.S. Patent Application Publication No. 2002/0173295, the contents of which are hereby incorporated by reference in its entirety.

Figure 3:
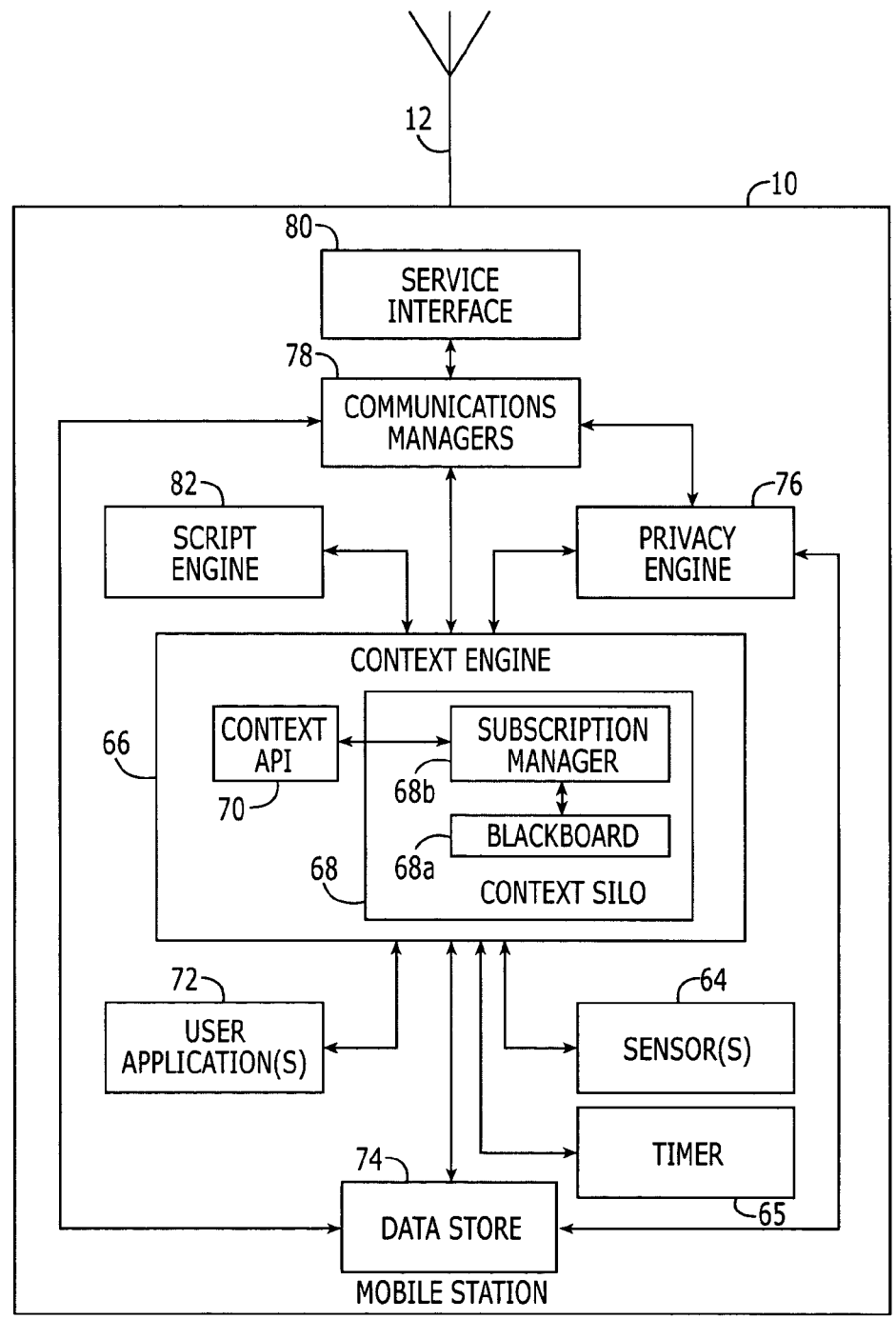
FIG. 3 is a schematic block diagram a context exchange architecture of a mobile terminal in accordance with one embodiment of the present invention.

The measured and/or sensed data may then be utilized, such as by the processor 33, to determine a context and/or change in context of the mobile terminal. Although the context and/or a change in context may be determined in various manners, the measured and/or sensed data may be transmitted according to one exemplary embodiment to a central blackboard that delegates the determined changes in the context to different destinations, such as the RFID transceiver 48, which includes a RFID reader, utilizing a context exchange architecture. FIG. 3 illustrates a context exchange architecture of a mobile terminal 10 to determine a context and/or change in context of the mobile terminal in accordance with one embodiment of the present invention. As shown in FIG. 3, the context exchange architecture of the mobile terminal 10 according to one embodiment of the present invention includes one or more sensors 64 that are capable of providing measured and/or sensed data, as described above. The sensors are further capable of preprocessing the measured and/or sensed data into "context atoms," such as by a sensor application program interface (API), and thereafter stored. As used herein, a "context atom" generally refers to a specific piece of context-related information. A context atom can comprise an entity that typically has an associated name, value, source (i.e., originator), date and/or any of a number of other attributes. More particularly, the context atom can include other attributes including metadata information, such as the reliability of the context-related information, as well as its accuracy, source, time of creation, etc. For example, a temperature sensor can measure the ambient temperature of the environment around the mobile terminal 10, and thereafter process the temperature into a context atom. Also, for example, the mobile terminal may store a directory that can measure, or record, the last call made from the mobile terminal. The last call data can then be processed into a context atom. Further, for example, a three-axis acceleration sensor can measure movement of the mobile terminal. Thereafter, the movement data can be processed into a context atom that may include the current absolute value of acceleration, the value integrated over several seconds, and/or a rough estimate whether the mobile terminal, or more particularly the mobile terminal user, is walking, running, standing still or perhaps sitting in a car.

The context exchange architecture of the mobile terminal 10 also includes a context engine 66, which is capable of receiving, and thereafter storing, the context atoms, as well as providing access to the context atoms in accordance with embodiments of the present invention. The context engine includes a context silo 68 and a context API 70. The context silo can, in turn, include a blackboard 68a and a subscription manager 68b. The blackboard is a storage unit for context-related information and, as such, typically stores the context atoms received from the sensors or other context sources (such as other electronic devices, applications, applications residing behind a network, other user terminals, etc.). Additionally, the blackboard can provide an API to query and set context atoms. The subscription manager, in turn, can provide subscriptions to various of the context atoms and/or notifications when such context atoms change. The subscription manager can therefore periodically poll the context atoms based upon such subscriptions and notifications. To provide access to the context silo, the context engine further includes the context API. In this regard, the context API allows one or more user applications 72 and/or one or more timers 65 to access the context data from the blackboard, in accordance with embodiments of the present invention. The timer 65 generally tracks the time between determinations of a change in context of the mobile terminal 10. In other embodiments of the mobile terminal 10, the timer 65 may be included in the user application(s) 72 and/or the context engine 66.

The blackboard 68a is capable of storing context atoms for an indefinite period of time, unless otherwise instructed. For example, one or more context atoms can include an expiration time such that after the respective context atoms expire, such context atoms can be deleted from the blackboard, with a notification transmitted to devices subscribing (described below) to the respective context atom, if so desired. As will be appreciated, however, each time a context atom is updated with different information (e.g., different values), the expiration time can be reset. Also, in such instances as when a new context atom is stored in the blackboard that has the same name and context source (indicating that it appeared from the same source) as a previous context atom already in the blackboard, the new context atom can replace the previous context atom, which can then be either discarded or moved to a history buffer, for example.

The context exchange architecture further includes a data store 74 coupled to the context engine 66. The data store is capable of storing information such as, for example, user preferences, profile information, as well as permissions for a privacy engine 76, also included within the architecture. The privacy engine is capable of providing security and privacy. More particularly, the privacy engine is capable of functioning on any of a number of different levels of security and privacy, from the lowest point of communication (e.g., a firewall) to the highest level (e.g., "who is my friend and who is not"). The user preferences and profiles in the data store, then, can control operation of the privacy engine. For example, the privacy engine can retrieve, from the data store, a list of known friends such that, when the mobile terminal 10 is queried for an action to be performed in accordance with embodiments of the present invention, the privacy engine can indicate whether the action is allowed by comparing the querying entity to the list of friends. In one advantageous embodiment, the privacy engine functions based on devices and/or user applications operating on context atoms in accordance with embodiments of the present invention, as well as a type of action, e.g., put, get, subscribe, notify, etc., as described below. It should be understood, however, that the privacy engine can also utilize other information, including other context atoms and data in the data store to make decisions as to permissions.

In addition to the sources of context-related information within the mobile terminal 10 (e.g., sensors 64 and other data measuring elements), the context exchange architecture can provide for receiving context-related information from sources outside the mobile terminal. In this regard, the context exchange architecture includes a communications manager 78, which can identify other context sources located within a communication distance from the mobile terminal. In addition to identifying the other context sources, the communications manager can initiate contact with such context sources and, in general, provide housekeeping for communications with such context sources. The communications manager can also function as a firewall (along with the privacy engine 76). Advantageously, the communications manager can abstract different connection types to the context engine 66 such that context atoms within the context engine can be stored and/or retrieved regardless of whether the communications manager communicates with other context sources via Bluetooth, GPRS, RFID, USB, or some other link type.

To facilitate the mobile terminal 10 communicating with the cellular network, data network and/or other electronic devices 44, the context exchange architecture also includes a service interface 80. The service interface operates in much the same manner as the context API 70 in the context engine 66. In this regard, the service interface can comprise, for example, an over-the-air interface, as well as the underlying transport protocols (e.g., Ethernet, GPRS, TCP/IP). In accordance with various embodiments of the present invention, the context exchange architecture also provides a context exchange protocol. Generally, the context exchange protocol comprises a standardized protocol that allows different entities to exchange context atoms in a secure and reliable fashion, regardless of underlying architecture or transmission channel. In this manner, for example, at least a portion of the context atoms stored in the blackboard 68a can be stored in a separate memory device, such as a memory device coupled to an origin server 24.

The context exchange architecture can additionally provide for creating new context atoms, as well as deleting and/or modifying existing context atoms. In this regard, the context exchange architecture can include a script engine 82, which can store rules and conditions. In one advantageous embodiment, the script engine is capable of receiving external rules according to the context exchange protocol, and thereafter storing the rules. The script engine can then examine the rules, subscribe to the relevant context atoms (described below), and then execute the rules according to conditions defined in the rules. The script engine allows complex rules to be executed for different events. As such, the script engine can reduce the need for application code, as well as reduce bandwidth requirements. Further, whereas the subscription manager typically only transmits notifications when a context atom changes, the script engine can further specify requirements of the conditions to transmit a notification. For example, the script engine can specify conditions such as "transmit a notification only when the value change by more than 20%." In one embodiment, for example, the rules can comprise one or more Java classes that include executable code defining the conditions of the rules, and/or extensible markup language (XML) scripts that include Boolean logic defining the conditions of the rules.

Each context rule typically includes one or more conditions and one or more actions to be performed when the conditions are satisfied. In this regard, the conditions of the context rules are typically related to the context atoms, or more particularly, the values in the context atoms. The script engine 82 can execute any of a number of different context rules that include any of a number of different actions. For example, the context rules can specify the setting of a value of a context atom, the transmission of a notification, and/or the transmission of a context atom to another device and/or application. Context rules can be exchanged between the mobile terminal 10 and other devices, such as electronic devices 44, in a number of different manners. In one embodiment, for example, context rules can be exchanged in accordance with the context exchange protocol, such as to add a new context rule, remove a context rule and/or notify a device of an expired or otherwise disabled context rule. Alternatively, context rules can be created internally within the mobile terminal.

The elements of the architecture have been described independent of the mobile terminal block diagram of FIG. 2. It should be understood, however, that the architecture of embodiments of the present invention, such as are illustrated in FIG. 3, are capable of being performed by a mobile terminal that includes the elements illustrated in FIG. 2. In this regard, at least a portion of the elements of the architecture are capable of being embodied in corresponding elements illustrated in FIG. 2. For example, the blackboard 68a and/or data store 74 are capable of being embodied in memory such as SIM 54, volatile memory 56 and/or non-volatile memory 58. Also, the functions of the context engine 66, script engine 82, privacy engine 76 and/or communications manager 78 are capable of being performed by controller 32 and/or processor 33. Additionally, or alternatively, one or more of the elements of the architecture of embodiments of the present invention can be performed by, and/or mirrored by, other elements of the cellular network and/or the data network of FIG. 1. For example, a copy of the contents of the blackboard in the mobile terminal can be maintained in an operator's server (e.g., origin server 24).

As indicated above, context atoms typically include at least a name and a value, and may also include metadata information such as, for example, its reliability, accuracy, source, time of creation, etc. In operation, the context atoms are typically created by entities called "context producers." A context producer can comprise any of a number of different internal or external systems, devices and/or elements capable of creating a context atom, but in one typical embodiment, a context producer can comprise an internal sensor 64 and/or user application 72, and/or an external system, device and/or element (e.g., sensor or user application) capable of pushing a context atom to the mobile terminal, such as in accordance with the context exchange protocol. Upon creation and/or receipt by the mobile terminal, the context atoms can be stored in the blackboard 68*a*. For example, a thermometer can measure the ambient temperature of the environment and process the temperature measurement into the context atom "environment.temperature=95° C.," which can then be stored by the blackboard 68*a*. Additionally, or alternatively, a temperature change over a period of time can be determined, such as by a user application 72, and stored by the blackboard. As another example, a sensor (input device) can retrieve a signal from local beacons that identify the location of the mobile terminal and process the signal into the context atom "location.logical=sauna," which can thereafter be stored by the blackboard.

The mobile terminal 10 can receive measurements from any of a number of different types of local beacons capable of transmitting information such as, for example, a Bluetooth device and/or a RFID tag. In this regard, when the local beacon comprises a RFID tag, a RFID transceiver 48 within the mobile terminal can receive the signal from the beacon by performing a service discovery to determine the RFID tag identifiers in the vicinity of the mobile terminal. The identifiers can then be stored by the blackboard as the context atoms "local RFID tag environment." Another application, referred to as a context consumer and described below, can then subscribe to the "local RFID tag environment," to thereby receive periodic updates of the measurements received by the RFID transceiver 48. In this regard, the mobile terminal can monitor the area proximate the mobile terminal for electronic devices, and request location information from them, if available. The mobile terminal can then store any available location information back on the blackboard 68*a*, where other applications (context consumers) can get the information. In the example given above, a RFID beacon can announce its location to be a sauna, so that mobile terminal stores the context atom "location.logical=sauna" in the blackboard.

The preceding example illustrated the mobile terminal 10 storing a context atom identifying a logical location (i.e., sauna). It should be understood, however, context atoms can be created to identify any of a number of other types of locations, such as an exact location (e.g., GPS coordinates and/or addresses) and/or a relative location (e.g., "next to K-Mart"). The use of the GPS sensor 62 can be advantageous for providing location information, particularly when the mobile terminal is located outdoors. Even the absence of GPS location information can be useful, however, such as indicating a probability that the mobile terminal is located indoors, where the GPS sensor may not be able to detect location information.

Once stored within the blackboard 68*a*, context atoms are typically retrieved by entities referred to as "context consumers." Like the context producer, a context consumer can comprise any of a number of different internal or external systems, devices and/or elements capable of retrieving a context atom. In this regard, when a context consumer desires to retrieve a context atom, the context consumer connects to the mobile terminal 10, such as according to the context exchange protocol when the context consumer is external to the mobile terminal or according to the context API 70 when the context consumer is internal to the mobile terminal. The context consumer can thereafter transmit a request to the context engine 66 identifying the context atom by name. For example, a request may read "Please give me a context atom called "environment.temperature," where the phrase "environment.temperature" represents the ambient temperature of the environment around the mobile terminal. Additionally, or alternatively, a context consumer can transmit a request identifying a context atom by the source of the respective context-related information, and/or a combination of the source and the context atom name, thereby permitting a context consumer to limit its queries to a specific context source. For example, a context consumer can transmit the request "Please give me all the context atoms provided by the temperature sensor in the mobile terminal." In one typical instance, an application may desire to act as a preprocessor to a singular sensor such that the application does not want to receive context atoms associated with other sensors providing the same context-related information. This, of course, means that the name of a context atom may not be unique, but that a context atom may be characterized by one or more other attributes, including the source of a context atom.

In response to the request, the context engine 66 can then query the privacy engine 76 as to whether the context consumer is allowed to retrieve the requested information. If the context consumer has permission to retrieve the requested context atom, the context atom is transmitted to the context consumer. In this regard, if the context atom is requested by an application internal to the mobile terminal, such as, for example, user application 72 or any other application associated with processor 33, the context atom is typically transmitted by the context engine through the context API 70. If the context atom is requested by an external application, however, the context atom is typically transmitted by the context API 70 to the communications manager 78, which will then transmit the context atom over a communications link in accordance with the context exchange protocol.

If the context consumer does not have permission to retrieve the requested context atom, however, the context atom is not transmitted to the context consumer. In such instances, the context engine 66 can transmit a message to the context consumer indicating that permission to retrieve the context atom was denied, if so desired. In case of a request received from an external application or device in accordance with the context exchange protocol, the request may be dropped silently, such as in the case of an error or a resend request. In other terms, the context engine can merely ignore the request, and therefore not transmit a response to the context consumer.

In addition to retrieving context atoms, context consumers may also be notified when particular context atoms change, such as when particular context atoms are added to the blackboard 68*a*, removed from the blackboard, and/or otherwise modified. In addition, the context consumers can also specify the extent of a change required before the respective context consumer is notified of the respective change. To receive notifications of changes to particular context atoms, context consumers may subscribe to particular context atoms by requesting to be placed on a notification list for one or more context atoms. As such, when the content of the respective context atom(s) contents change or expire, the context engine 66 can issue a notification to the context consumer. As will be appreciated, however, the context engine will typically check with the privacy engine 76 to determine if the consumer is allowed to receive such notifications. Thereafter, the context engine can keep the context consumer notified of any changes by transmitting a notification to the context consumer following each such change or expiration of the respective context atoms. Whereas any of a number of changes can require notification, the context engine typically transmits a notification in the event of the appearance and disappearance of an atom, change of an atom contents, and/or termination of the subscription.

Once a context consumer retrieves one or more context atoms, the context consumer can utilize the context atoms to determine a context of the mobile terminal 10 (or the user of the mobile terminal), such that the mobile terminal, for example, can be operated based upon the determined context. In this regard, the context consumer can determine a context of the mobile terminal, or more particularly the user of the mobile terminal, based upon requested context atoms, and thereafter transmit the context back to the mobile terminal such that the mobile terminal can perform one or more actions based upon the context. For example, the context information can be utilized to configure the mobile terminal based upon the determined context, such as by changing the volume of the mobile terminal according to ambient noise (physical context), changing menus displayed by the mobile terminal according to whether a user is with a digital tribe associated with the user (social context), and/or highlighting email messages that have the same context as an email displayed by the mobile terminal (subject context). For more information on the context exchange architecture, see U.S. Provisional Patent Application No. 60/460,316, entitled "System, Mobile Station and Method for Managing Context-Related Information" filed on Apr. 3, 2003, the contents of which are hereby incorporated by reference in its entirety.

In accordance with embodiments of the present invention, the terminal 10, such as via the communications manager 78 described above, is capable of reading a tag type from a tag 46, and thereafter performing a predefined action based upon the tag type and a state of the terminal. Each tag can have any of a number of different tag types. For example, one or more tags can have the tag type, "Read Only," which designates the respective tag(s) as only being capable of transmitting data to the terminal during operation in accordance with the method of embodiments of the present invention. Also, for example, one or more tags can have the tag type, "Read/Write," which designates the respective tag(s) as being capable of transmitting data to and/or receiving data from the terminal during operation in accordance with the method of embodiments of the present invention. In addition, one or more transceivers 49 (e.g., one or more radio frequency transceivers) of one or more other electronic devices 44 may each be capable of operating as a tag during operation of the method of embodiments of the present invention. In such instances, each transceiver operating as a tag can have the tag type "Transceiver in Show Mode," which designates the respective transceiver as being capable of operating as a tag, typically having a "Read Only" tag type. It should be understood, however, that the tag type "Transceiver in Show Mode," can designate the respective transceiver as being capable of operating as a tag having a "Read/Write" tag type.

A RFID transceiver (which includes a RFID reader) associated with a mobile terminal therefore typically interrogates an area proximate the mobile terminal during a service discovery to determine if any RFID tags are present in that area. In accordance with embodiments of the present invention, if the RFID reader detects a tag 46, then the RFID reader may at least read a tag identifier from the tag. If the RFID reader determines that it has read the tag during a previous interrogation based upon a comparison of the tag identifier to a list of tag identifiers stored by the mobile terminal and associated with those tags read during a previous interrogation, then it may not read the rest of the tag, thereby increasing the operational efficiency and decreasing the power consumption. If, however, the RFID reader determines that the tag has not been read during a previous interrogation, then the RFID reader will read the tag and perform any further function as described above. For example, the RFID reader may read the tag and determine that the mobile terminal should transmit certain data to and/or receive data from the RFID transceiver, if any, associated with the tag.

In addition, the processor 33 and/or user applications(s) 72 may also utilize the information received from the RFID reader, such as via the communications manager 78, to at least contribute to the determination of a context and/or change in context of the mobile terminal, as described above. For example, if the RFID reader detects the same group of RFID tags during a current interrogation that the RFID reader detected during a previous interrogation, then the processor 33 may utilize that information, alone or in conjunction with other measured and/or sensed data, such as data indicating the mobile terminal has not moved appreciably, to determine that the context of the mobile device has likely not changed. If, however, the RFID reader does identify any type of change in the RFID tags detected during an interrogation of the area proximate the mobile terminal as compared to a prior interrogation of the area proximate the mobile terminal, then the processor 33 may utilize that information, alone or in conjunction with other measured and/or sensed data, to determine that the context of the mobile device has changed.

Typically, the RFID reader associated with a mobile terminal interrogates the area proximate the mobile terminal for RFID tags on a periodic basis at a predefined interval, such as every 300 ms, which can consume a significant amount of power and drain the battery 60 much faster than in mobile terminals that are not associated with a RFID reader. Thus, in accordance with embodiments of the present invention, the method, terminal and computer program product of the present invention utilizes the determination of the context and/or change in context made by the mobile terminal to adjust the power consumption of a RFID reader and, therefore, reduce the power consumption of the RFID reader associated with a mobile terminal.

Figure 4:
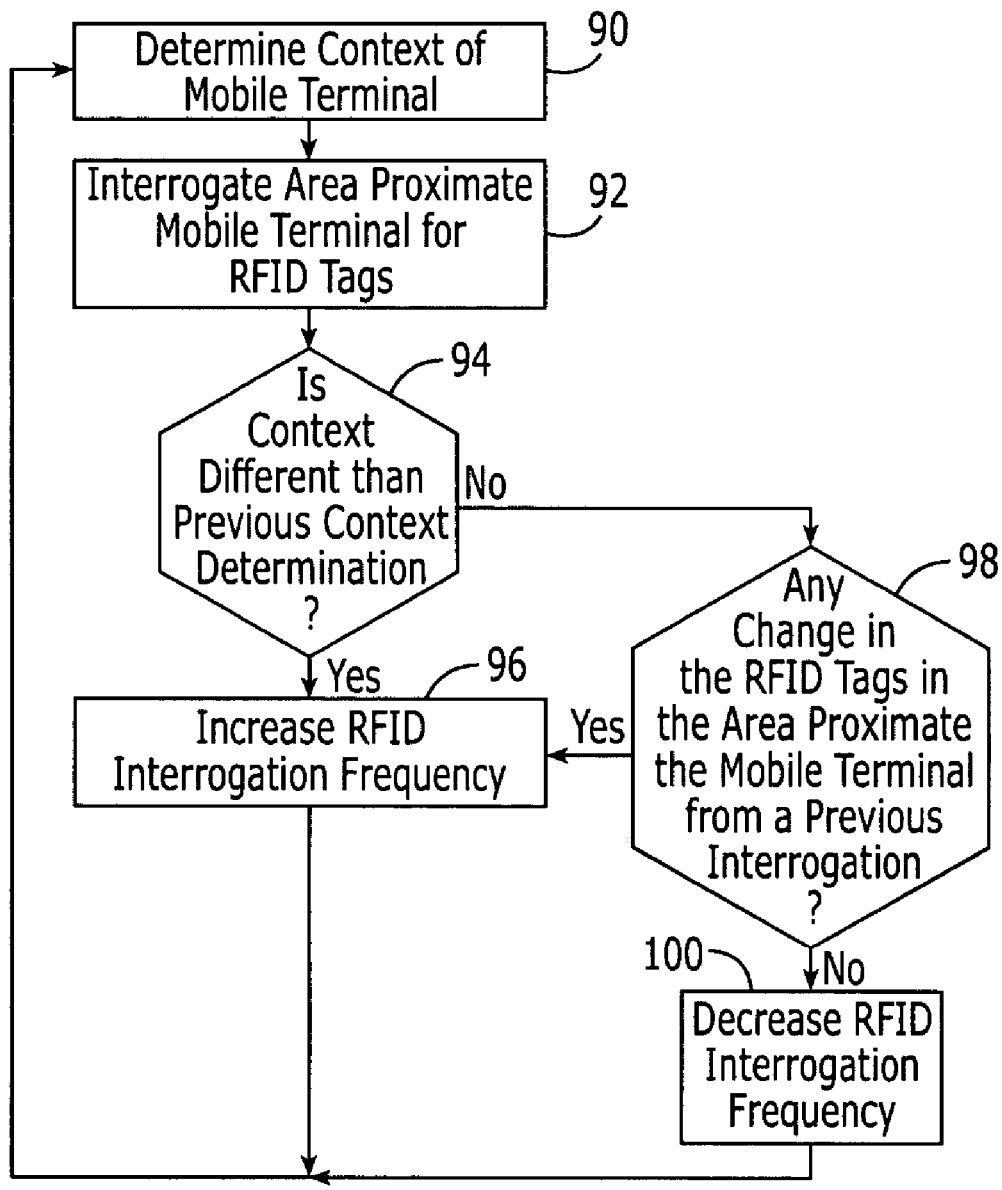
FIG. 4 is a flowchart illustrating various steps in a method for adjusting power consumption of a RFID reader associated with a mobile terminal in accordance with one embodiment of the present invention.

FIG. 4 illustrates various steps in a method for adjusting the power consumption of a RFID reader associated with a mobile terminal in accordance with an embodiment of the present invention. The context of the mobile terminal is determined (block 90), such as via the techniques described in association with the context exchange architecture described above including, for example, an analysis of the RFID tags identified during a prior interrogation of the area proximate the mobile terminal. The RFID transceiver 48 again interrogates the area proximate the mobile terminal for RFID tags, such as described above (block 92). The method then determines whether the context is different than a previous context determination (block 94), such as the immediately previous context determination. If so, the RFID interrogation frequency may be increased (block 96) since the environment of the mobile terminal is changing. If the RFID interrogation frequency is already at the maximum frequency, then it is unnecessary to increase the frequency. If, however, the frequency is not at the maximum frequency, then the frequency may be increased by any increment desired. For instance, if the RFID interrogation frequency is every 1000 ms prior to the determination of a change in context and the maximum RFID interrogation frequency is every 300 ms, then the RFID interrogation frequency may be increased to any frequency between 1000 ms and 300 ms (including 300 ms).

If the context determination of block 90 is not different than a previous context determination, such as the immediately previous context determination, then the method may determine whether there is any change in the RFID tags detected in the area proximate the mobile terminal from a previous interrogation (block 98), such as the immediately previous interrogation to determine if the mobile terminal and/or an object carrying a RFID tag in the vicinity of the mobile terminal has moved even though the context has remained the same. For example, the current interrogation may detect more, fewer or different RFID tags than the previous interrogation. Although FIG. 4 illustrates the interrogation change determination of block 98 occurring after the context change determination of block 94, the interrogation change determination may occur prior to, simultaneous with, or subsequent to the context change determination. If one or more of the RFID tags in the area proximate the mobile terminal have changed, then the RFID interrogation frequency may be increased (block 96) if it is not at the maximum frequency in the same way as described above regarding block 96. If, however, the same set of RFID tags is identified in the current interrogation as in a prior interrogation, then the RFID interrogation frequency may be decreased by any increment desired (block 100). For instance, if the RFID interrogation frequency is every 1000 ms prior to the determination of no change in context or detected RFID tags, then the RFID interrogation frequency may be decreased and the desired increment between interrogations may be increased above 1000 ms. In some embodiments, the RFID interrogation may be ceased after such a determination of no change in the RFID tags proximate the mobile terminal and/or no change in context. In this embodiment, the RFID interrogation may be ceased for a predetermined amount of time and/or until the next change in context of the mobile terminal is determined.

The RFID interrogation frequency may be continuously adjusted based upon the context and/or RFID tag detection determinations as shown in the embodiment of the method of FIG. 4. For example, if it is determined that the context of a mobile terminal has not changed since a prior context determination and there is no change in the RFID tags proximate the mobile device since a prior interrogation, then the RFID interrogation frequency may be decreased, such as from every 300 ms to every 1000 ms. By decreasing the RFID interrogation frequency, the RFID transceiver consumes less power, such as in instances in which the mobile terminal and its environment are station, for example. If the context of the mobile device does not change at the next context determination and there continues to be no change in the RFID tags proximate the mobile device, then the RFID interrogation frequency may be further decreased, such as to every 5000 ms or even ceased, as described above. Thus, the power consumption of the RFID transceiver is reduced even further. When the next context change and/or change in RFID tags detected in the area proximate the mobile terminal happens, then the RFID interrogation frequency may be increased, such as back to every 300 ms or any other frequency that is desired.

In addition, in some embodiments of the present invention, the frequency may be related to the type of change in context of the mobile device and/or the type of change in RFID tags detected in the area proximate the mobile terminal. For example, a context determination indicating that the mobile terminal is moving may cause a greater increase in the RFID interrogation frequency than that occasioned by a context determination indicating that only the temperature proximate the mobile terminal has changed. In the same way, a determination of new detected RFID tags in the area proximate the mobile terminal may cause a greater increase in the RFID interrogation frequency than that occasioned by a determination of fewer detected RFID tags in the area proximate the mobile terminal.

While the above discussion describes changes in the RFID interrogation frequency based upon any change in the tags detected during an interrogation, embodiments of the method of present invention could alternatively utilize thresholds over which the tags in the area proximate the mobile terminal must change before the RFID interrogation frequency changes. For example, if the threshold is five, then the number and/or type of RFID tags in the area proximate the mobile terminal must change by five or more as compared number and/or type of RFID tags detected in a previous RFID interrogation before the RFID interrogation frequency can change accordingly. In addition, in certain embodiments, the amount the RFID interrogation frequency is altered may depend upon the number of different RFID tags detected in the area proximate the mobile terminal as compared to a previous RFID interrogation.

In certain embodiments of the present invention, the RFID interrogation frequency may be altered by changing the operational mode of the RFID transceiver. For example, the operational mode of the RF transceiver 48 may be changed among a full-power active mode, one or more partial power modes, a low-power sleep mode, an off mode, and/or any other operational modes known to those skilled in the art, such as via a switch 61, as described above. As such, each of the operational modes may be associated with a RFID interrogation frequency and, thus, the RFID interrogation frequency changes accordingly as the associated operational mode changes.

Thus, in one advantageous embodiment, the processor 33 and/or controller 32 in conjunction with certain applications and/or scripts, such as user applications 72 and/or script engine 82, respectively, provide the instructions necessary to adjust the power consumption and/or RFID interrogation frequency of the RFID transceiver based upon the context determinations and/or RFID tag detections. As such, the processor 33 and/or controller 32 may access applications or scripts that are included in the processor and/or controller, and/or that are in communication with the processor and/or controller via any wireline and/or wireless techniques known to those skilled in the art, that provide instructions based upon the context and/or RFID tag detection determinations, as described above.

Therefore, in accordance with the above discussion regarding FIG. 3, once the context consumer, such as a user application 72, determines the context of the mobile terminal, or more particularly the user of the mobile terminal, based upon requested context atoms, and thereafter transmits the context back to the mobile terminal such that the controller 32 and/or processor 33 can perform one or more actions based upon the context. For example, controller 32 and/or processor can adjust the power consumption of the RFID transceiver based upon the context and/or change in context determinations as described above.

In this regard, FIG. 4 is a flowchart of methods, systems and program products according to the invention. It will be understood that each block or step of the flowcharts, and combinations of blocks in the flowcharts, can be implemented by computer program instructions. These computer program instructions may be loaded onto a computer or other programmable apparatus to produce a machine, such that the instructions which execute on the computer or other programmable apparatus create means for implementing the functions specified in the flowchart block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flowchart block(s) or step(s).

Accordingly, blocks or steps of the flowcharts support combinations of means for performing the specified functions, combinations of steps for performing the specified functions and program instruction means for performing the specified functions. It will also be understood that each block or step of the flowchart, and combinations of blocks or steps in the flowchart, can be implemented by special purpose hardware-based computer systems that perform the specified functions or steps, or combinations of special purpose hardware and computer instructions.

Thus, the method, terminal and computer program product of the present invention are capable of adjusting the power consumption of RFID readers that are associated with mobile terminals based upon the context of the mobile terminal. The RFID reader, therefore, uses less power when the associated mobile terminal has a particular context or when certain changes in the context of the mobile terminal are not detected. As such, other than when the mobile terminal has a particular context or when certain changes in the context of the mobile terminal are detected, RFID readers associated with mobile terminals operate at relatively low power levels. Due to the adjustment of power consumption by RFID readers, the present invention conserves power of the mobile terminals associated with RFID readers, which permits the mobile terminals and RFID readers to operate longer without requiring charging or replacement of the power supply as compared to mobile terminals associated with RFID readers that do not use these techniques.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for adjusting power consumption of a radio frequency identification (RFID) reader associated with a mobile terminal, comprising:
    determining a context of the mobile terminal, wherein determining a context of the mobile terminal comprises detecting any RFID tags in an area proximate the mobile terminal in response to interrogation by the RFID reader;
    determining whether a context of the mobile terminal has changed, wherein determining a change in context comprises monitoring changes in the detection of RFID tags in the area proximate the mobile terminal relative to a prior interrogation to indicate a change in context of the mobile terminal; and
    adjusting the power consumption of the RFID reader based upon the context of the mobile terminal relative to at least one previous context determination of the mobile terminal, wherein adjusting the power consumption of the RFID reader comprises altering the frequency at which the RFID reader is actuated, and wherein adjusting the power consumption includes reducing the power consumption of the RFID reader when no change in the context of the mobile terminal is determined.

2. The method for adjusting power consumption according to claim 1, wherein adjusting the power consumption further includes increasing the power consumption of the RFID reader when a change in the context of the mobile terminal is determined.

3. The method for adjusting power consumption according to claim 2, wherein increasing the power consumption of the RFID reader comprises increasing the frequency at which the area proximate the mobile terminal is interrogated by the RFID reader when a change in the context of the mobile terminal is determined.

4. The method for adjusting power consumption according to claim 1, wherein reducing the power consumption of the RFID reader comprises reducing the frequency at which the area proximate the mobile terminal is interrogated by the RFID reader when no change in the context of the mobile terminal is determined.

5. The method for adjusting power consumption according to claim 1, wherein reducing the power consumption of the RFID reader comprises ceasing interrogation of the area proximate the mobile terminal by the RFID reader until a change in context of the mobile terminal is detected.

6. The method for adjusting power consumption according to claim 1, wherein adjusting the power consumption of the RFID reader comprises changing an operational mode of the RFID reader.

7. A method for adjusting power consumption of a radio frequency identification (RFID) reader associated with a mobile terminal, comprising:
    detecting any RFID tags in an area proximate the mobile terminal in response to interrogation by the RFID reader;
    determining whether a context of the mobile terminal has changed, wherein determining a change in context comprises monitoring changes in the detection of RFID tags in the area proximate the mobile terminal relative to a prior interrogation to indicate a change in context of the mobile terminal; and
    adjusting the power consumption of the RFID reader based upon the determination of whether the context of the mobile terminal has changed, wherein adjusting the power consumption includes reducing the power consumption of the RFID reader when no change in the context of the mobile terminal is determined.

8. The method for adjusting power consumption according to claim 7, wherein adjusting the power consumption further includes increasing the power consumption of the RFID reader when a change in the context of the mobile terminal is determined.

9. The method for adjusting power consumption according to claim 8, wherein increasing the power consumption of the RFID reader comprises increasing the frequency at which the area proximate the mobile terminal is interrogated by the RFID reader when a change in the context of the mobile terminal is determined.

10. The method for adjusting power consumption according to claim 7, wherein reducing the power consumption of the RFID reader comprises reducing the frequency at which the area proximate the mobile terminal is interrogated by the RFID reader when no change in the context of the mobile terminal is determined.

11. The method for adjusting power consumption according to claim 7, wherein reducing the power consumption of the RFID reader comprises ceasing interrogation of the area proximate the mobile terminal by the RFID reader until a change in context of the mobile terminal is determined.

12. The method for adjusting power consumption according to claim 7, wherein adjusting the power consumption of the RFID reader comprises changing an operational mode of the RFID reader.

13. A mobile terminal comprising:
a radio frequency identification (RFID) reader, wherein said RFID reader detects any RFID tags in an area proximate the mobile terminal in response to interrogations by said RFID reader;
at least one processor to determine a context of the mobile terminal based upon information received regarding an environment of the mobile terminal, wherein said at least one processor monitors any changes in the detection of RFID tags in the area proximate the mobile terminal relative to a prior interrogation to determine whether the context of the mobile terminal has changed; and
at least one controller in communication with said at least one processor that adjusts the power consumption of said RFID reader based upon the context of the mobile terminal by altering the frequency at which said RFID reader is actuated, wherein said at least one controller adjusts the power consumption of said RFID reader based upon the determination of whether the context of the mobile terminal has changed,
wherein adjusting the power consumption includes reducing the power consumption of said RFID reader when no change in the context of the mobile terminal is determined.

14. The mobile terminal according to claim 13, wherein said at least one processor comprises said at least one controller.

15. The mobile terminal according to claim 13, further comprising at least one sensor to provide at least a portion of the information received regarding the environment of the mobile terminal.

16. The mobile terminal according to claim 15, wherein said at least one sensor comprises at least one of a proximity detector, a movement detector, and a temperature detector.

17. The mobile terminal according to claim 13, further comprising a timer for tracking time between determinations of a change in context.

18. The mobile terminal according to claim 13, further comprising a switch in communication with said at least one controller to adjust the power consumption of said RFID reader by changing an operational made of said RFID reader.

19. The mobile terminal according to claim 13, wherein:
said RFID reader comprises at least one of said at least one processor and said at least one controller.

20. A computer program product for adjusting power consumption of a radio frequency identification (RFID) reader associated with a mobile terminal, the computer program product comprising a computer-readable storage medium having computer-readable program code portions stored therein, the computer-readable program code portions comprising:
a first executable portion capable of determining a context of the mobile terminal, wherein said first executable portion is capable of determining the context of the mobile terminal by detecting any RFID tags in an area proximate the mobile terminal in response to interrogation by the RFID reader,
wherein said first executable portion is also capable of determining whether a context of the mobile terminal has changed, wherein determining a change in context comprises monitoring changes in the detection of RFID tags in the area proximate the mobile terminal relative to a prior interrogation to indicate a change in context of the mobile terminal; and
a second executable portion capable of adjusting the power consumption of the RFID reader based upon the context of the mobile terminal relative to at least one previous context determination of the mobile terminal, wherein adjusting the power consumption of the RFID reader comprises altering the frequency at which the RFID reader is actuated, and
wherein said second executable portion is capable of reducing the power consumption of the RFID reader when no change in the context of the mobile terminal is determined by said first executable portion.

21. The computer program product for adjusting power consumption according to claim 20, wherein said second executable portion is also capable of increasing the power consumption of the RFID reader when a change in the context of the mobile terminal is determined by said first executable portion.

22. The computer program product for adjusting power consumption according to claim 21, wherein said second executable portion is capable of increasing the power consumption of the RFID reader by increasing the frequency at which the area proximate the mobile terminal is interrogated by the RFID reader when a change in the context of the mobile terminal is determined by said first executable portion.

23. The computer program product for adjusting power consumption according to claim 20, wherein said second executable portion is capable of reducing the power consumption of the RFID reader by reducing the frequency at which the area proximate the mobile terminal is interrogated by the RFID reader when no change in the context of the mobile terminal is determined by said first executable portion.

24. The computer program product for adjusting power consumption according to claim 20, wherein said second executable portion is capable of reducing the power consumption of the RFID reader by ceasing interrogation of the area proximate the mobile terminal by the RFID reader until a change in context of the mobile terminal is detected by said first executable portion.

25. The computer program product for adjusting power consumption according to claim 20, wherein said second executable portion is also capable of adjusting the power consumption of the RFID reader by changing an operational mode of the RFID reader.

26. A radio frequency identification (RFID) device, comprising:
a RFID reader for detecting any RFID tags in response to interrogations by said RFID reader;
at least one processor to determine a context of the device based upon information received regarding an environment of the device, wherein said at least one processor monitors any changes in the detection of RFID tags relative to a prior interrogation to determine whether the context of the device has changed; and at least one controller in communication with said at least one processor for adjusting the power consumption of said RFID reader based upon the context of the device by altering the frequency at which said RFID reader is actuated, wherein said at least one controller adjusts the power consumption of said RFID reader based upon the determination of whether the context of the device has changed, wherein adjusting the power consumption includes reducing the power consumption of said RFID reader when no change in the context of the device is determined.

27. The RFID device according to claim 26, wherein said at least one processor comprises said at least one controller.

28. The RFID device according to claim 26, further comprising at least one sensor to provide at least a portion of the information received regarding the environment of the device.

29. The RFID device according to claim 28, wherein said at least one sensor comprises at least one of a proximity detector, a movement detector, and a temperature detector.

30. The RFID device according to claim 26, further comprising a timer for tracking time between determinations of a change in context.

31. The RFID device according to claim 26, further comprising a switch in communication with said at least one controller to adjust the power consumption of said RFID reader by changing an operational mode of said RFID reader.

32. The RFID device according to claim 26, wherein:
said RFID reader comprises at least one of said at least one processor and said at least one controller.

* * * * *